(12) United States Patent
Leather

(10) Patent No.: US 6,637,621 B2
(45) Date of Patent: Oct. 28, 2003

(54) OBJECT ASSEMBLY DEVICE FOR ASSEMBLING ROLLING OBJECTS

(76) Inventor: Brendan N. Leather, 1524 Waterford Pl., Fort Mill, SC (US) 29708

( * ) Notice: Subject to any disclaimer, the term of this patent is extended or adjusted under 35 U.S.C. 154(b) by 15 days.

(21) Appl. No.: 09/944,863

(22) Filed: Aug. 31, 2001

(65) Prior Publication Data

US 2002/0159867 A1 Oct. 31, 2002

Related U.S. Application Data

(63) Continuation-in-part of application No. 09/526,991, filed on Mar. 16, 2000, now Pat. No. 6,405,894.

(51) Int. Cl.$^7$ ................................................. B65H 3/58
(52) U.S. Cl. ....................... 221/168; 221/163; 221/162; 221/156; 221/167
(58) Field of Search ................................ 221/258, 263, 221/264, 265, 277, 156, 162, 163, 167, 168

(56) References Cited

U.S. PATENT DOCUMENTS 6,405,894 B1 * 6/2002 Leather ...................... 221/168

* cited by examiner

*Primary Examiner*—David H. Bollinger
(74) *Attorney, Agent, or Firm*—Schwartz Law Firm, P.C.

(57) ABSTRACT

An object assembly device automatically assembles a collection of rolling objects of identical size and shape. The assembly device includes an assembly housing having an inlet for receiving rolling objects and an outlet through which the rolling objects are discharged. A rotary feed cone is rotatably mounted within the housing between the inlet and the outlet. The feed cone defines a single-line travel channel having an entrance end and an exit end. The width of the travel channel is sufficient to accommodate no more than a single line of rolling objects moving downstream in succession from the entrance end of the channel to the exit end. A stationary cone base is located within the collection housing, and has a conical interior wall adapted for receiving the rotary feed cone. The cone base has an object discharge opening operatively aligned with the exit end of the travel channel to allow passage of objects outwardly through the cone base in an assembled single-line condition.

18 Claims, 8 Drawing Sheets

OBJECT ASSEMBLY DEVICE FOR ASSEMBLING ROLLING OBJECTS

This is a continuation-in-part of Application Ser. No. 09/526,991 filed Mar. 16, 2000, now U.S. Pat. No. 6,405,894.

TECHNICAL FIELD AND BACKGROUND OF INVENTION

This invention relates to a object assembly device for automatically assembling a collection of rolling objects, such as anti-friction bearings, buckshot, golf balls, gum drops, paint balls, and the like. The invention dispenses the rolling objects in continuous, single-line succession for loading into, for example, packaging and machinery.

Prior art devices for automatically feeding and assembling rolling objects are known, but have proven to be generally ineffective for many reasons. As a whole, these devices are relatively expensive, use complex machinery, are generally slow and inefficient, and will often damage the surface of the objects during assembly.

SUMMARY OF THE INVENTION

Therefore, it is an object of the invention to provide a object assembly device for automatically assembling a collection of rolling objects, and then dispensing the objects in continuous single-line succession.

It is another object of the invention to provide an object assembly device which is non-vibratory, quite, and smooth-running.

It is another object of the invention to provide an object assembly device which reduces the likelihood of any damage to the object during assembly.

It is another object of the invention to provide an object assembly device which feeds and assembles objects in a continuous, non-interrupted manner.

It is another object of the invention to provide an object assembly device which provides substantially accelerated assembly.

It is another object of the invention to provide an object assembly device which includes a variable speed control.

It is another object of the invention to provide an object assembly device which is non-magnetic.

It is another object of the invention to provide an object assembly device which is readily adapted for assembling objects of various size.

It is another object of the invention to provide an object assembly device which includes shielded internal components for protecting the objects from potential friction damage.

It is another object of the invention to provide an object assembly device which is a modular, self-contained unit.

It is another object of the invention to provide an object assembly device which can be mounted onto most existing machines.

It is another object of the invention to provide an object assembly device which can be manufactured in unlimited shapes and sizes.

It is another object of the invention to provide an object assembly device which can be mounted on or off an existing machine.

It is another object of the invention to provide an object assembly device which can be powered by an electric or pneumatic motor.

It is another object of the invention to provide an object assembly device which can be gear-driven or driven by one or more flex cables.

It is another object of the invention to provide an object assembly device which is conveniently disassembled for cleaning.

It is another object of the invention to provide an object assembly device which includes easily removable and exchangeable components to allow assembly of larger or smaller object.

These and other objects of the present invention are achieved in the preferred embodiments disclosed below by providing an object assembly device for automatically assembling a collection of rolling objects of identical size and shape. The assembly device includes an assembly housing having an inlet for receiving rolling objects, and an outlet for discharging rolling objects. A rotary feed cone is rotatably mounted within the housing between the inlet and the outlet. The feed cone defines a single-line travel channel having an entrance end and an exit end. The width of the travel channel is sufficient to accommodate no more than a single line of rolling objects moving downstream in succession from the entrance end of the channel to the exit end. Objects entering the travel channel from the inlet of the housing are discharged through the outlet of the housing in an assembled single-line condition. A stationary cone base is located within the collection housing, and has a conical interior wall adapted for receiving the rotary feed cone. The cone base has an object discharge opening operatively aligned with the exit end of the travel channel to allow passage of objects outwardly through the cone base. Drive means are provided for rotating the rotary feed cone relative to the cone base to avoid obstructing accumulation of rolling objects at the entrance end of the travel channel.

According to another preferred embodiment of the invention, the stationary cone base includes means for removably securing the cone base in position relative to the rotary feed cone.

Preferably, the means for removably securing the cone base is a spring-loaded ball plunger. Alternatively, this means may comprise interfering shoulders, dowel pins, thumbscrews, a simple friction attachment, removable screws, bolts, or rivets, or a releasable clamp.

According to another preferred embodiment of the invention, the travel channel extends in a generally helical path around the rotary feed cone between a top of the cone and a bottom of the cone.

According to another preferred embodiment of the invention, the travel channel extends in a generally straight path from a top of the cone to a bottom of the cone.

According to another preferred embodiment of the invention, a stationary cone cover is placed over the rotary feed cone to protect objects from friction damage caused during assembly.

According to another preferred embodiment of the invention, a diffuser plate is located above the stationary cone cover. The diffuser plate has a generally convex top surface for directing objects entering the collection housing outwardly towards an interior wall of the collection housing.

According to another preferred embodiment of the invention, the diffuser plate has a diameter slightly less than an inside diameter of the collection housing. A number of spaced openings are formed around a perimeter edge of the diffuser plate for allowing controlled passage of objects through the diffuser plate to the object feed cone.

According to another preferred embodiment of the invention, the drive means includes a longitudinal drive shaft operatively connected to a motor and to the rotary feed cone for rotating the feed cone relative to the cone base. Alternatively, the drive means may comprise a manual crank.

According to another preferred embodiment of the invention, a pivoted lid is located at the inlet of the collection housing, and is adapted for being opened to allow insertion of objects into the collection housing.

According to another preferred embodiment of the invention, an outlet spout is located at the outlet of the collection housing for controlling the single-line discharge of assembled objects.

According to another preferred embodiment of the invention, a flexible feed tube extends from the outlet spout for directing the discharge of assembled objects outwardly from the collection housing.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
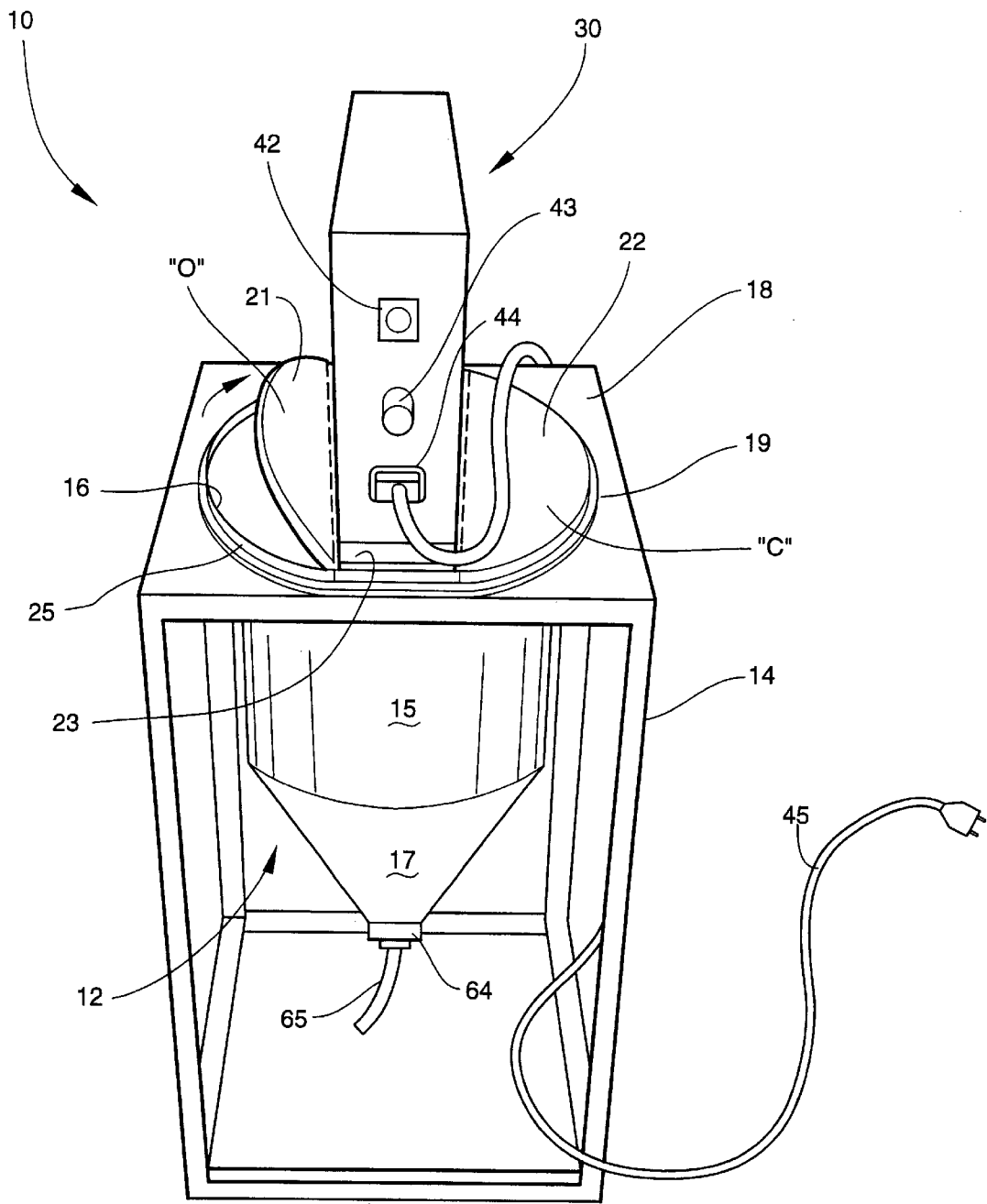
FIG. 1 is a perspective view of the object assembly device according to one preferred embodiment of the invention.

Referring now specifically to the drawings, a object assembly device according to the present invention is illustrated in FIG. 1 and shown generally at reference numeral 10. The device 10 is applicable for automatically assembling a collection of identical rolling objects, such as anti-friction bearings, buckshot, golf balls, gum drops, paint balls, and the like. The device 10 dispenses the assembled objects in continuous, single-line succession for convenient loading into, for example, machinery or packaging.

Figure 2:
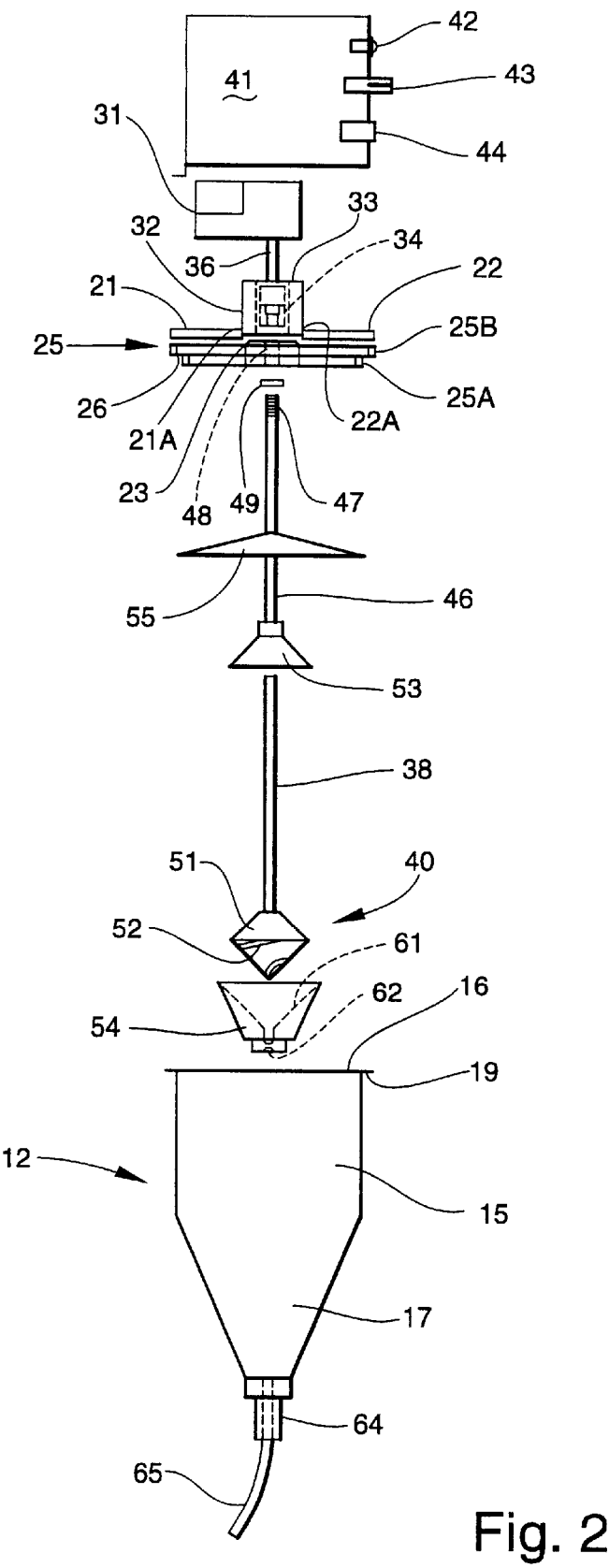
FIG. 2 is an exploded elevational view of the object assembly device with the motor housing and electric motor rotated 90 degrees for clarity.

Referring to FIGS. 1 and 2, the device 10 includes an assembly housing comprising a collection hopper 12 vertically mounted on a support stand 14, and having a generally cylindrical upper body portion 15 with an open top 16 defining an inlet for receiving objects to be assembled, and a generally conical lower body portion 17 through which the assembled objects are dispensed. The collection hopper 12 fits into a center opening formed in a top wall 18 of the support stand 14, and has an outwardly extending annular mounting flange 19 around its open top 16. The mounting flange 19 attaches to the top wall of the support stand using metal screws, rivets, or other suitable means (not shown).

A pair of semi-circular hinged lids 21 and 22 are connected to a lateral crosspiece 23 of an annular lid brace 25 positioned over the open top 16 of the collection hopper 12. As shown in FIG. 2, the lid brace 25 has a lower ring member 25A with a diameter slightly less than an inner diameter of the collection hopper 12 at its open top 16, and an upper ring member 25B formed with the lower ring member 25A and having a greater diameter. The space between the upper and lower ring members 25A, 25B defines an annular shoulder 26 which engages the mounting flange 19 of the collection hopper 12 to support the lid brace 25 over the open top 16 of the collection hopper 12. The lids 21 and 22 are pivotable about their respective hinges 21A and 22A between an open position "O" for inserting objects into the collection hopper 12, and a closed position "C" for retaining objects in the collection hopper 12 during assembly. Preferably, the lids 21 and 22 are formed of a generally transparent durable plastic, such as Lexan.

A motor assembly 30 is centrally positioned above the collection hopper 12, and includes an electric motor 31 positioned on a mounted block 32 carried by the crosspiece 23 of the lid brace 25. The mounting block 32 has an opening 33 for receiving a drive shaft adapter 34 which interconnects the actuating arm 36 of the motor 31 and the vertical drive shaft 38 of an object assembler 40. A motor assembly housing 41 is placed over the electric motor 31 and includes an electric switch 42 and speed dial 43 connected to the motor 31 for controlling the operation and speed of the motor 31, and a power adapter inlet 44 for connecting a power cord 45 to an external power supply source.

The drive shaft 38 of the object assembler 40 extends through a stationary tubular sleeve 46. The sleeve 46 has a threaded end 47 which mates with a complementary-threaded opening 48 formed in the crosspiece 23 of the lid brace 25, and aligned with the actuating arm 36 of the motor 31. A lock-nut 49 is used to prevent rotation and inadvertent detachment of the sleeve 46 from the lid brace 25 during operation of the device 10.

Figure 3:
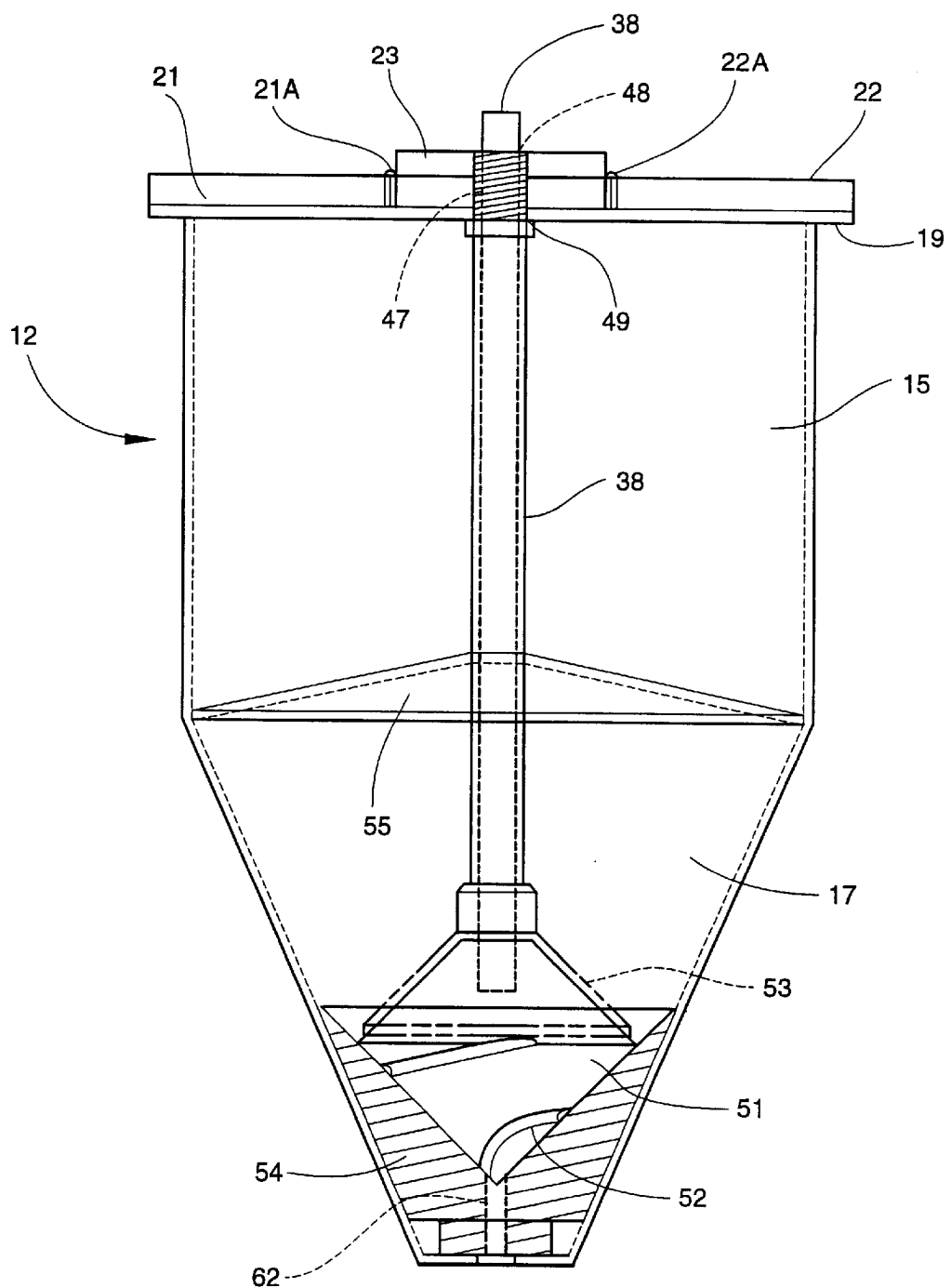
FIG. 3 is an elevational view of the collection hopper with a surface broken away to show the interior components of the object assembly device, and showing the cone base in cross-section and cone cover in phantom.
Figure 4:
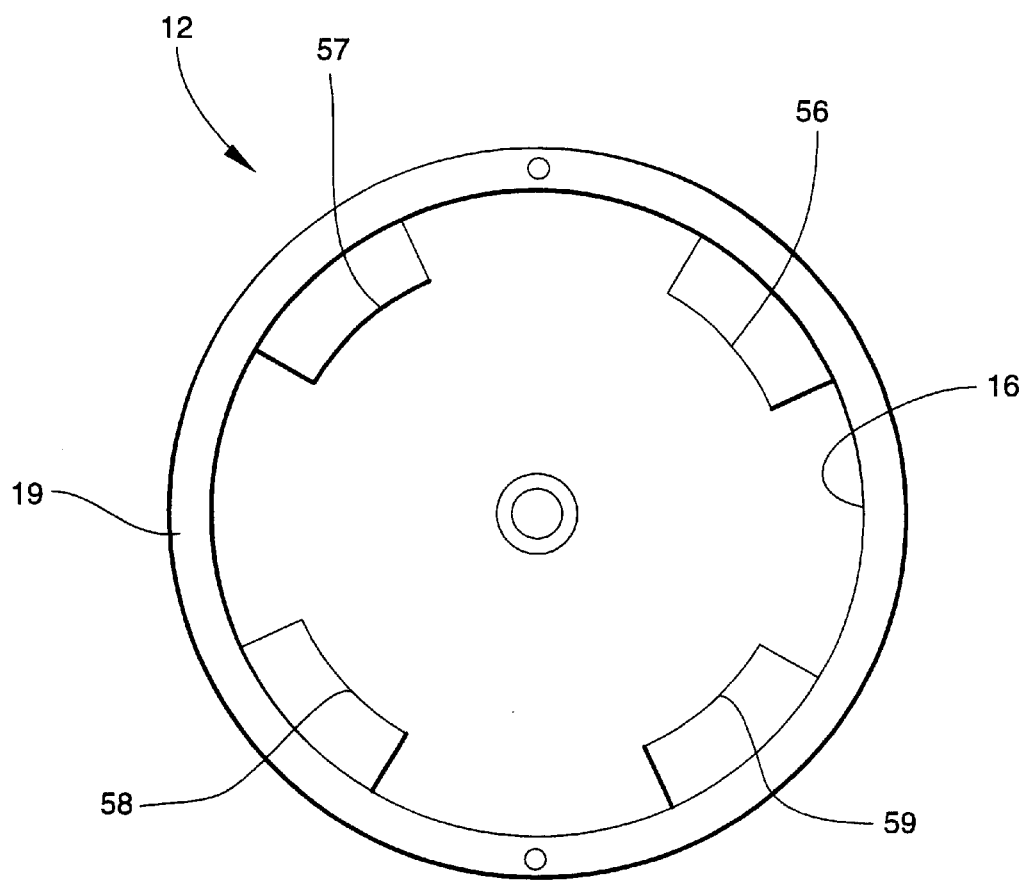
FIG. 4 is a top plan view of the collection hopper with the motor assembly removed and showing the openings of the weight diffuser plate.

According to one embodiment, the object assembler 40 comprises a rotary feed cone 51 with a helical groove 52 formed around its exterior surface. The groove 52 extends substantially 360 degrees from a top of the feed cone 51 to the bottom, and defines an object travel channel through which the objects travel in continuous, single-line succession to the outlet of the collection hopper 12. As best shown in FIGS. 2 and 3, the rotary feed cone 51 fits between a stationary cone cover 53 attached to an end of the tubular sleeve 46 and a stationary cone base 54. The cone cover 53 provides a protective barrier between the objects contained in the collection hopper 12 and an upper end of the rotary feed cone 51. A generally convex weight diffuser plate 55 is attached to the stationary sleeve 46 above the cone cover 53, and has several spaced perimeter openings 56, 57, 58, and 59 (See FIG. 4) adapted to control the delivery of objects from the inlet of the collection hopper 12 to the rotary feed cone 51, thereby limiting any damage to the objects which may result upon their random insertion into the collection hopper 12.

Referring again to FIGS. 2 and 3, the cone base 54 has a tapered interior wall 61 shaped to fit against the exterior of the rotary feed cone 51, and an object discharge opening 62 aligned with an exit end of the groove 52 at the bottom of the rotary feed cone 51 to allow passage of objects outwardly through the cone base 54. The cone base 54 connects to an outlet spout 64 which controls the single-line discharge of assembled objects outwardly from the collection hopper 12. A flexible feed tube 65 is preferably connected to the outlet spout 64, and serves to direct the discharge of assembled objects into, for example, machinery or packaging, as desired by the user.

Operation of the Object Assembly Device 10

To operate the object assembly device 10, the user first activates the electric motor 31 by pressing switch 42 on the motor assembly housing 41. The electric motor 31 powers the actuating arm 36 causing rotation of the drive shaft 38 attached to the rotary feed cone 51. The drive shaft 38 rotates the rotary feed cone 51 at a selected speed set by the user using the speed dial 43. One of the lids 21 is then opened, and a collection of like rolling objects to be assembled is poured into the collection hopper 12. The objects fall vertically against the weight diffuser plate 55 and immediately roll outwardly towards the inner wall of the collection hopper 12 and through the openings 56, 57, 58, and 59 formed in the diffuser plate 55. The objects accumulate in an annular loading zone "Z" formed between the stationary cone cover 53, rotary feed cone 51, and cone base 54, and are captured one object at a time at the entrance end of the travel channel defined by the helical groove 52. The space defining the object loading zone "Z" is adjustable by adjusting the location of the stationary cone cover 53 relative to the rotary feed cone 51 based on the amount of tubular sleeve 46 received into the threaded opening 48 of the crosspiece 23. Continuous rotation of the feed cone 51 prevents obstructing accumulation of objects at the entrance end of the helical groove 52. As the feed cone 51 rotates, the objects move downstream along the helical groove 52 in continuous single-line succession, and outwardly from the collection hopper 12 through the outlet spout 64 and feed tube 65. Preferably, the device 10 is capable of dispensing as many as 50 0.25" diameter ball-bearings in a single revolution of the rotary feed cone 51.

Alternative Embodiments

Figure 5:
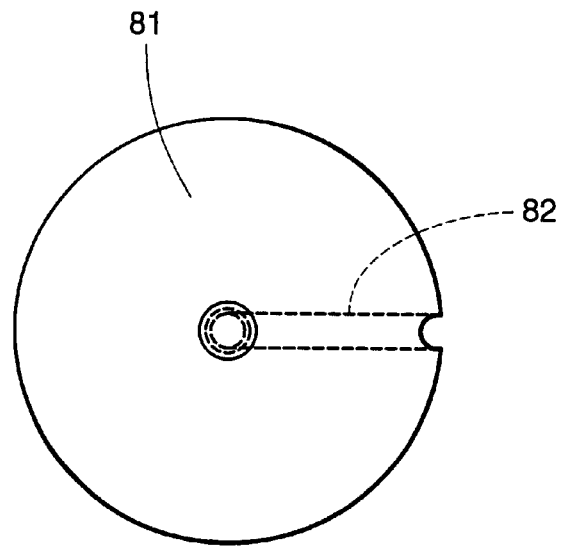
FIG. 5 is a top plan view of a rotary feed cone according to a second preferred embodiment of the invention.
Figure 6:
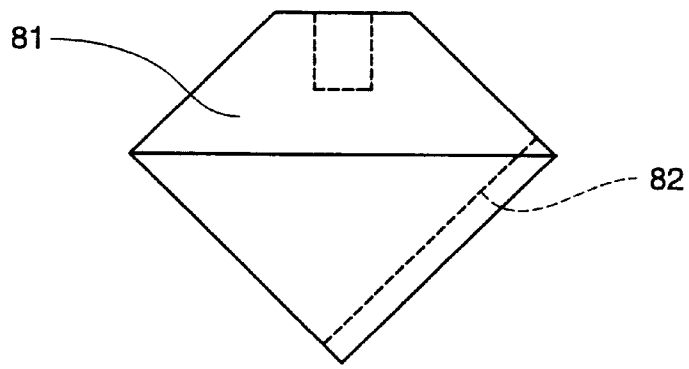
FIG. 6 is a side elevational view of the rotary feed cone shown in FIG. 5.
Figure 7:
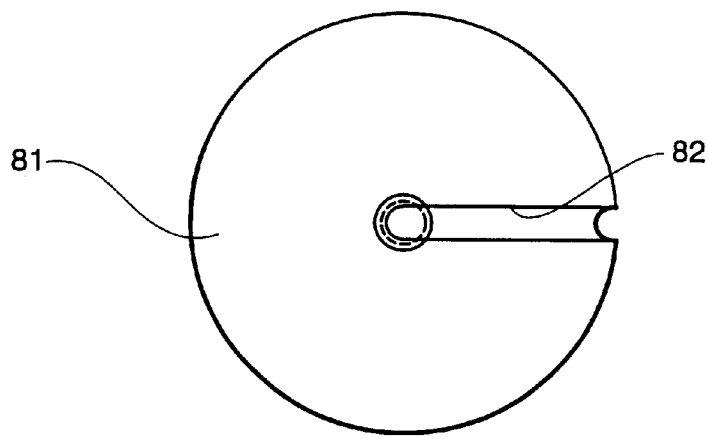
FIG. 7 is a bottom plan view of the rotary feed cone shown in FIGS. 5 and 6.

A second embodiment of the rotary feed cone is illustrated in FIGS. 5, 6, and 7. The rotary feed cone 81 operates within an identical environment described above with reference to the rotary feed cone 51, and has a generally straight line groove 82 formed in its exterior surface which extends from a top of the feed cone 81 to the bottom. The groove 82 defines an object travel channel through which the objects travel in continuous, single-line succession to the outlet of the collection hopper.

Figure 8:
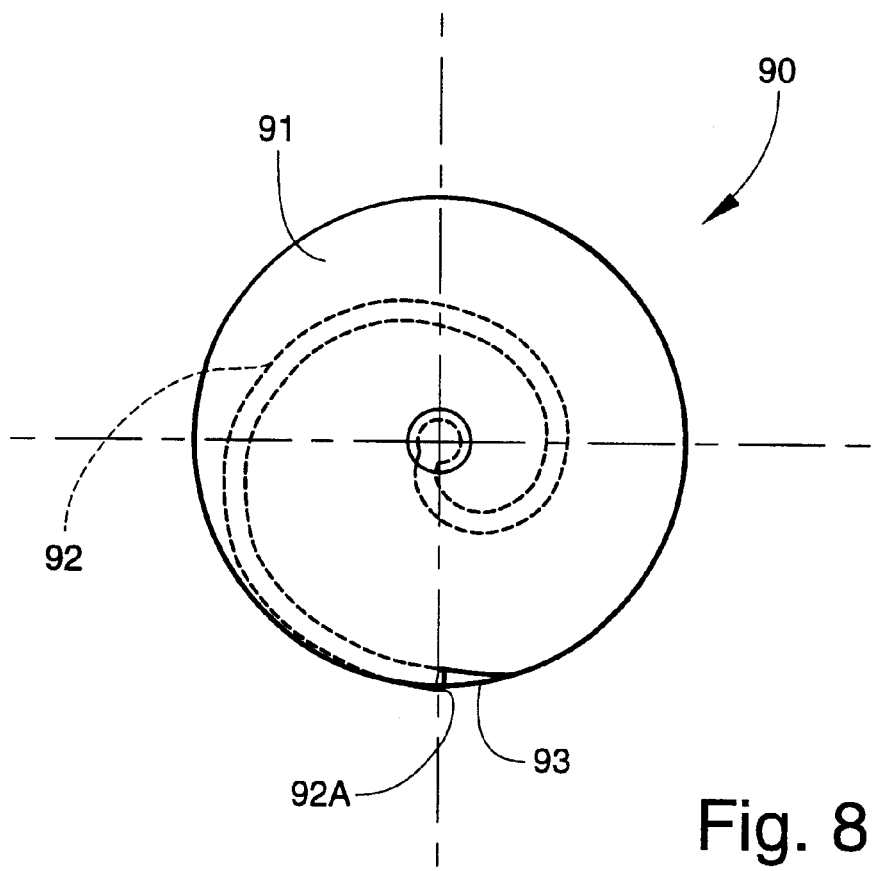
FIG. 8 is top plan view of an object assembler according to a third preferred embodiment of the invention.
Figure 9:
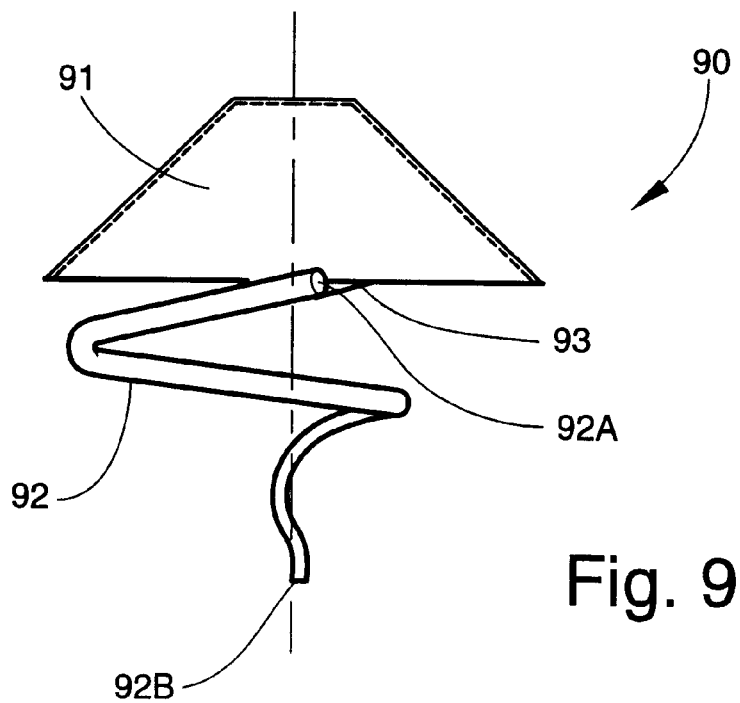
FIG. 9 is a side elevational view of the object assembler shown in FIG. 8.

A third embodiment of an object assembler is shown in FIGS. 8 and 9. The object assembler 90 includes an inverted rotary cone 91 attached to the vertical drive shaft (not shown), and having a bottom perimeter diameter which is slightly less than the inner diameter of the collection hopper to seal the space between the rotary cone 91 and collection hopper. A helical tube 92 defining an object travel channel depends from the bottom perimeter of the rotary cone 91, and has an entrance opening 92A aligned with a descending loading ramp 93 formed in the rotary cone 91. The helical tube 92 directs the objects to be assembled downstream in single-line succession from the inlet of the collection hopper to the outlet. Continuous rotation of the rotary cone 91 prevents obstructing accumulation of objects at the entrance opening 92A of the helical tube 92. The exit opening 92B of the helical tube 92 is aligned with an outlet spout and flexible tube, as previously described.

Figure 10:
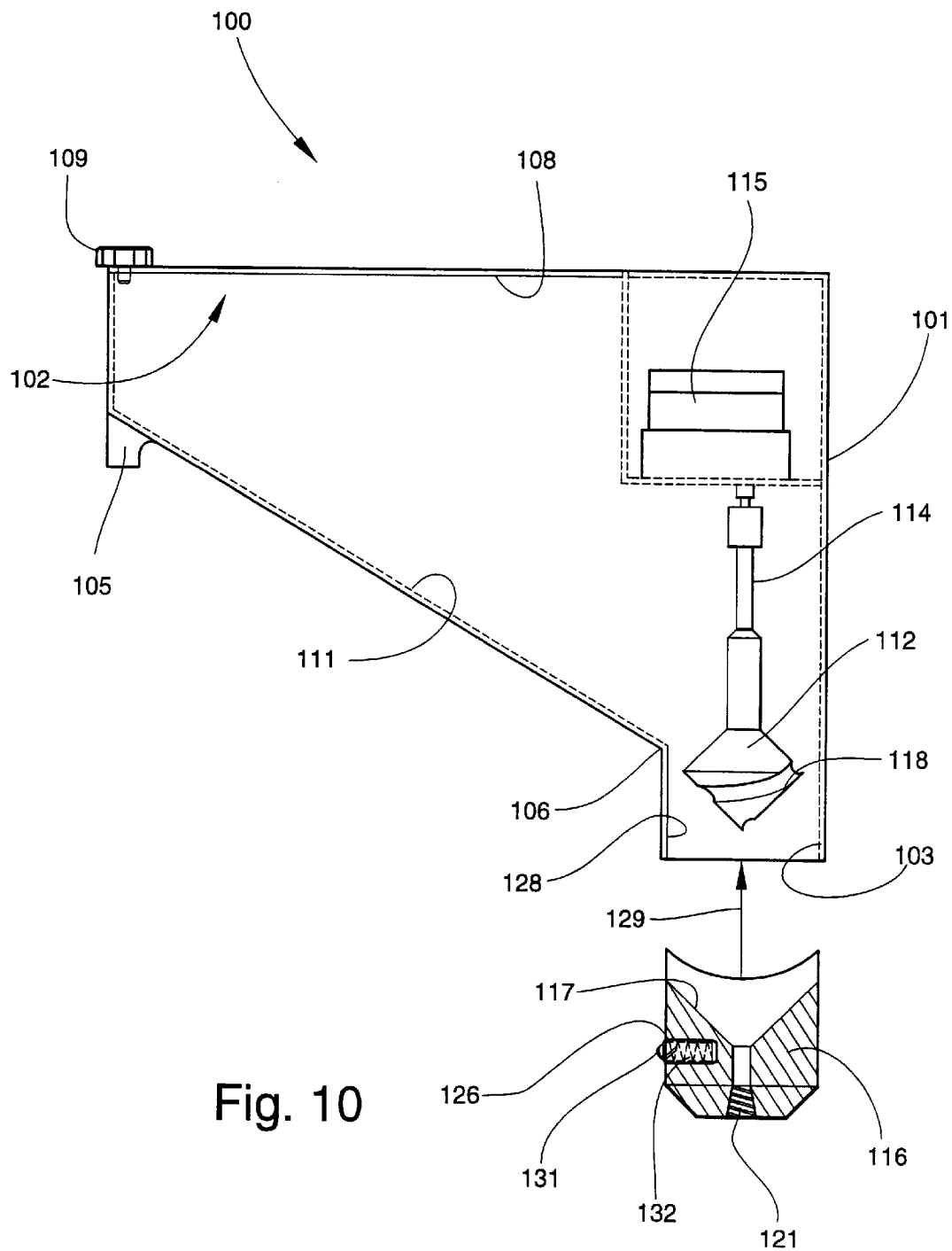
FIG. 10 is a side elevational view of an object assembly device according to a fourth preferred embodiment of the invention.
Figure 11:
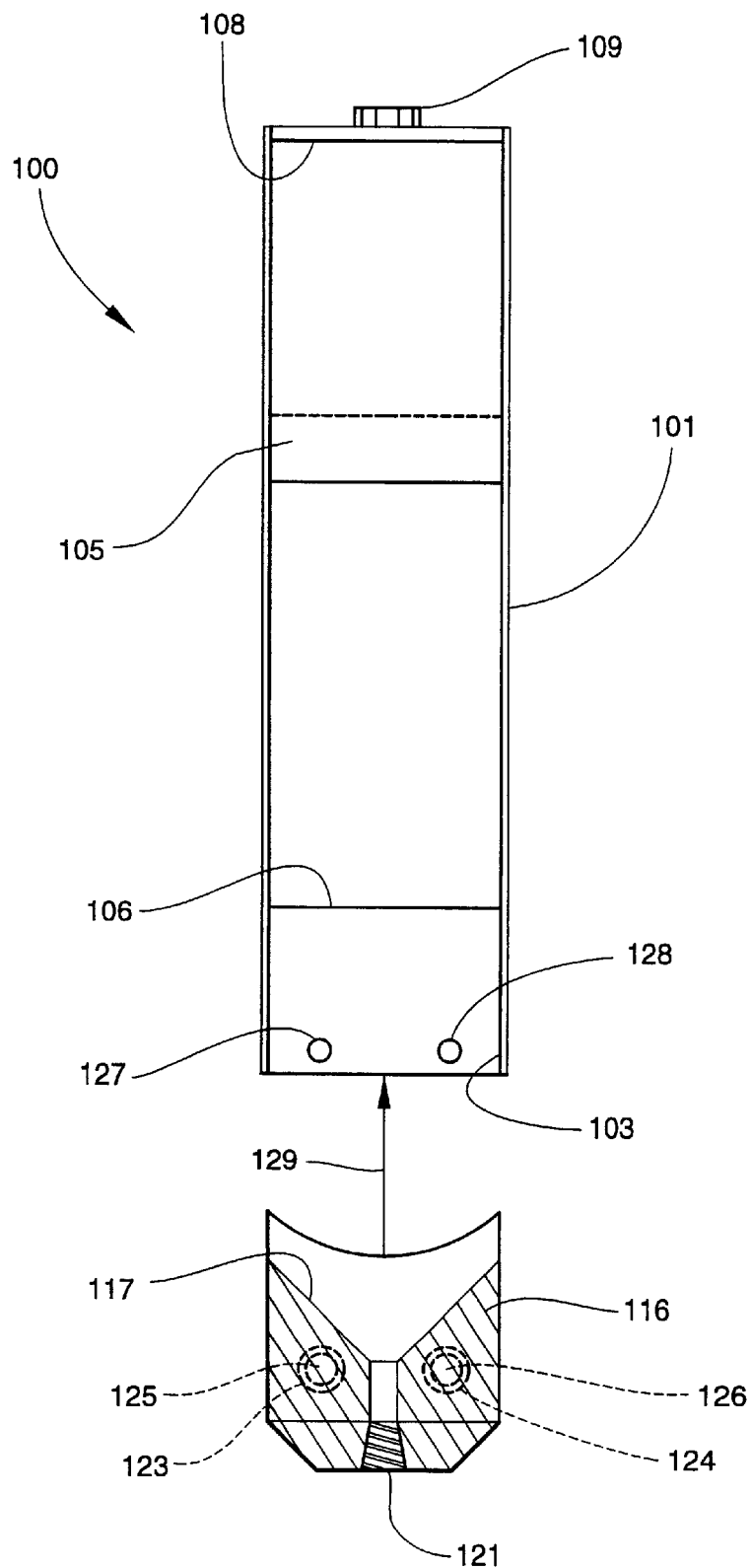
FIG. 11 is a rear elevational view of the object assembly device shown in FIG. 10.

FIGS. 10 and 11 illustrate a fourth embodiment of an object assembly device 100 according to the present invention. The device 100 includes an assembly housing 101 with an inlet 102 for receiving rolling objects to be assembled, and outlet 103 through which the rolling objects are discharged. The rolling objects are spherical and of uniform size. The housing 101 includes a mounting lip 105 and bend 106 which engage respective support bars (not shown), or other suitable structure, located in a facility using the device 100. The support structure positions the device 100 a spaced distance above the floor of the facility. After loading the objects into the housing 101, the inlet 102 is closed by a hinged door 108 with a locking screw 109. The locking screw 109 holds the door 108 closed during operation of the device 100. From the housing inlet 102, the unassembled rolling objects fall downwardly against an declined guide wall 111 to the rotary feed cone 112. As previously described, the feed cone 112 is rotatably mounted on a vertical drive shaft 114 powered by an electric motor 115. A removable, stationary cone base 116 is located proximate the outlet 103 of the housing 101, and defines a generally cone-shaped interior wall 117 adapted to receive the feed cone 112. A helical groove 118 is formed around the exterior portion of the rotary feed cone 112, and cooperates with the interior wall 117 of the cone base 116 to define an object travel channel, or bearing raceway, through which the rolling objects travel in continuous, single-line succession. From an exit end of the groove 118, the rolling objects pass through a discharge opening 121 in the cone base 116 and outwardly from the housing 101 in an assembled, single-line condition.

In cases where less than all of the objects loaded into the device 100 are required for use in a given application, the stationary cone base 116 can be easily removed from the housing 101 to allow quick object changeover. With the cone base 116 removed, the unused and unassembled objects are conveniently discharged through the outlet 103 and replaced with objects of a different size. If the new objects to be assembled are either substantially larger or smaller, the existing feed cone 112 may be replaced with a modified cone having a wider or narrower groove.

Preferably, the cone base 116 defines a pair of spaced openings 123 and 124 for receiving respective spring-loaded ball plungers 125 and 126. Complementary spaced holes 127 and 128 are formed in the assembly housing 101. When inserting the cone base 116 into the housing 101, as indicated by arrow 129, respective spherical tips 131 (See FIG. 10) of the ball plungers 125 and 126 retract against the force of the springs 132 as the cone base 116 slides into position adjacent the rotary feed cone 116. The tips 131 locate and extend within respective holes 127 and 128 of the assembly housing 101 to secure to cone base 116 in position during operation of the device 100.

An object assembly device is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. An object assembly device for automatically assembling a collection of rolling objects of identical size and shape, said assembly device comprising:
   (a) an assembly housing having an inlet for receiving rolling objects and an outlet through which the rolling objects are discharged;
   (b) a rotary feed cone rotatably mounted within said housing between the inlet and the outlet, and defining a single-line travel channel having an entrance end and an exit end, and a width sufficient to accommodate no more than a single line of rolling objects moving downstream in succession from the entrance end of said travel channel to the exit end;
   (c) a stationary cone base secured to said assembly housing and having a conical interior wall adapted for receiving said rotary feed cone, and an object discharge opening operatively aligned with the exit end of said travel channel to allow passage of objects outwardly through said cone base for discharge in an assembled single-line condition; and
   (d) drive means for rotating said rotary feed cone relative to said cone base to avoid obstructing accumulation of rolling objects at the entrance end of said travel channel.

2. An object assembly device according to claim 1, wherein said stationary cone base comprises means for removably securing said cone base in position relative to said rotary feed cone.

3. An object assembly device according to claim 2, wherein said means for removably securing said cone base comprise a spring-loaded ball plunger.

4. An object assembly device according to claim 1, wherein said travel channel extends in a generally helical path around said rotary feed cone between a top of said cone and a bottom of said cone.

5. An object assembly device according to claim 1, wherein said travel channel extends in a generally straight path from a top of said cone to a bottom of said cone.

6. An object assembly device according to claim 1, and comprising a stationary cone cover placed over the rotary feed cone to protect objects from friction damage caused during assembly.

7. An object assembly device according to claim 6, and comprising a diffuser plate located above the stationary cone cover and having a generally convex top surface for directing objects entering said assembly housing outwardly towards an interior wall of said assembly housing.

8. An object assembly device according to claim 7, wherein said diffuser plate has a diameter slightly less than an inside dimension of said assembly housing, and a number of spaced openings formed around a perimeter edge of said diffuser plate for allowing controlled passage of objects through the diffuser plate to the object feed cone.

9. An object assembly device according to claim 1, wherein said drive means comprises a longitudinal drive shaft operatively connected to a motor and to said rotary feed cone for rotating said feed cone relative to said cone base.

10. An object assembly device according to claim 1, and comprising a pivoted lid located at the inlet of said assembly housing, and adapted for being opened to allow insertion of objects into said assembly housing.

11. An object assembly device according to claim 1, and comprising an outlet spout located at the outlet of said assembly housing for controlling the single-line discharge of assembled objects.

12. An object assembly device according to claim 11, and comprising a flexible feed tube extending from said outlet spout for directing the discharge of assembled objects outwardly from said assembly housing.

13. An object assembly device for automatically assembling a collection of rolling objects of identical size and shape, said assembly device comprising:
   (a) an assembly housing having an inlet for receiving rolling objects and an outlet through which the rolling objects are discharged;
   (b) a rotary feed cone rotatably mounted within said housing between the inlet and the outlet, and defining a single-line helical travel channel having an entrance end and an exit end, and a width sufficient to accommodate no more than a single line of rolling objects moving downstream in succession from the entrance end of said travel channel to the exit end;
   (c) a removable stationary cone base mounted within said assembly housing and having a conical interior wall adapted for receiving said rotary feed cone, and an object discharge opening operatively aligned with the exit end of said travel channel to allow passage of objects outwardly through said cone base for discharge in an assembled single-line condition;
   (d) means for removably securing said cone base in position relative to said rotary feed cone; and
   (e) a drive shaft operatively connected to a motor and to said rotary feed cone for rotating said feed cone relative to said cone base to avoid obstructing accumulation of rolling objects at the entrance end of said travel channel.

14. An object assembly device according to claim 13, wherein said means for removably securing said cone base comprises a spring-loaded ball plunger.

15. An object assembly device according to claim 13, and comprising a pivoted lid located at the inlet of said assembly housing, and adapted for being opened to allow insertion of objects into said assembly housing.

16. An object assembly device according to claim 13, and comprising an outlet spout located at the outlet of said assembly housing for controlling the single-line discharge of assembled objects.

17. An object assembly device according to claim 16, and comprising a flexible feed tube extending from said outlet spout for directing the discharge of assembled objects outwardly from said assembly housing.

18. An object assembly device for automatically assembling a collection of rolling objects of identical size and shape, said assembly device comprising:
   (a) an assembly housing having an inlet for receiving rolling objects, an outlet through which the rolling objects are discharged, and a pivoted lid located at the inlet and adapted for being opened to allow insertion of objects into said assembly housing;
   (b) a rotary feed cone rotatably mounted within said housing between the inlet and the outlet, and defining a single-line travel channel having an entrance end and an exit end, and a width sufficient to accommodate no more than a single line of rolling objects moving downstream in succession from the entrance end of said travel channel to the exit end;

(c) a removable stationary cone base mounted within said assembly housing and having a conical interior wall adapted for receiving said rotary feed cone, and an object discharge opening operatively aligned with the exit end of said travel channel to allow passage of objects outwardly through said cone base for discharge in an assembled single-line condition;

(d) a spring-loaded ball plunger positioned within said cone base and adapted for engaging a wall of said assembly housing for removably securing said cone base in position relative to said rotary feed cone; and (e) a drive shaft operatively connected to a motor and to said rotary feed cone for rotating said feed cone relative to said cone base to avoid obstructing accumulation of rolling objects at the entrance end of said travel channel.

\* \* \* \* \*